United States Patent
Keate

(10) Patent No.: US 9,052,191 B1
(45) Date of Patent: Jun. 9, 2015

(54) MULTIFUNCTIONAL BUBBLE LEVEL

(71) Applicant: Leroy J. Keate, Salt Lake City, UT (US)

(72) Inventor: Leroy J. Keate, Salt Lake City, UT (US)

(*) Notice: Subject to any disclaimer, the term of this patent is extended or adjusted under 35 U.S.C. 154(b) by 185 days.

(21) Appl. No.: 13/910,784

(22) Filed: Jun. 5, 2013

(51) Int. Cl.
*G01C 9/26* (2006.01)

(52) U.S. Cl.
CPC .......................................... *G01C 9/26* (2013.01)

(58) Field of Classification Search
CPC ............... G01C 9/24; G01C 9/26; G01C 9/34
USPC ............................................ 33/354, 379, 381
See application file for complete search history.

(56) References Cited

U.S. PATENT DOCUMENTS

| | | | |
|---|---|---|---|
| 4,700,489 A | 10/1987 | Vasile | |
| 5,519,942 A * | 5/1996 | Webb | 33/DIG. 21 |
| 6,205,670 B1 * | 3/2001 | Webb | 33/520 |
| 6,360,446 B1 * | 3/2002 | Bijawat et al. | 33/451 |
| 6,640,456 B2 | 11/2003 | Owoc et al. | |
| D488,729 S | 4/2004 | Golaszewski et al. | |
| 2004/0118001 A1 | 6/2004 | Turpin | |
| 2004/0172839 A1 | 9/2004 | Zirk et al. | |
| 2004/0172846 A1 | 9/2004 | McRae | |
| 2013/0091717 A1 * | 4/2013 | Steele et al. | 33/379 |
| 2013/0269196 A1 * | 10/2013 | Steele et al. | 33/379 |
| 2014/0373371 A1 * | 12/2014 | Silberberg | 33/381 |

* cited by examiner

*Primary Examiner* — Brad Bennett

(57) ABSTRACT

The present invention features a multifunctional bubble level with integrated laser distance measurer and tape measurer. The bubble level has one horizontal bubble tube, one vertical tube and one inclination bubble tube. A tape measure is removably attached to one end of the level and a programmable laser distance measurer is attached on the opposite end of the level. At least one grip handle slot is optionally disposed on the bubble level.

10 Claims, 6 Drawing Sheets

MULTIFUNCTIONAL BUBBLE LEVEL

FIELD OF THE INVENTION

The present invention relates to a bubble level and more particularly to a multifunctional bubble level with integrated laser distance measurer and tape measurer.

BACKGROUND OF THE INVENTION

A bubble level is an instrument designed to indicate whether a surface is horizontal or vertical. Various types of bubble levels may be used by carpenters, stonemasons or bricklayers. Typically, a small transparent bubble tube is embedded in the middle of the level. When the surface holding the level is horizontal, vertical or at designated angle, the bubble within the bubble tube is located in the middle of the bubble tube.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a multifunctional bubble level with integrated laser distance measurer and tape measurer. The bubble level has one horizontal bubble tube, one vertical tube and one inclination bubble tube. A tape measure is removably attached to one end of the level and a programmable laser distance measurer is attached on the opposite end of the level. At least one grip handle slot is optionally disposed on the bubble level.

DESCRIPTION OF PREFERRED EMBODIMENTS

Figure 1:
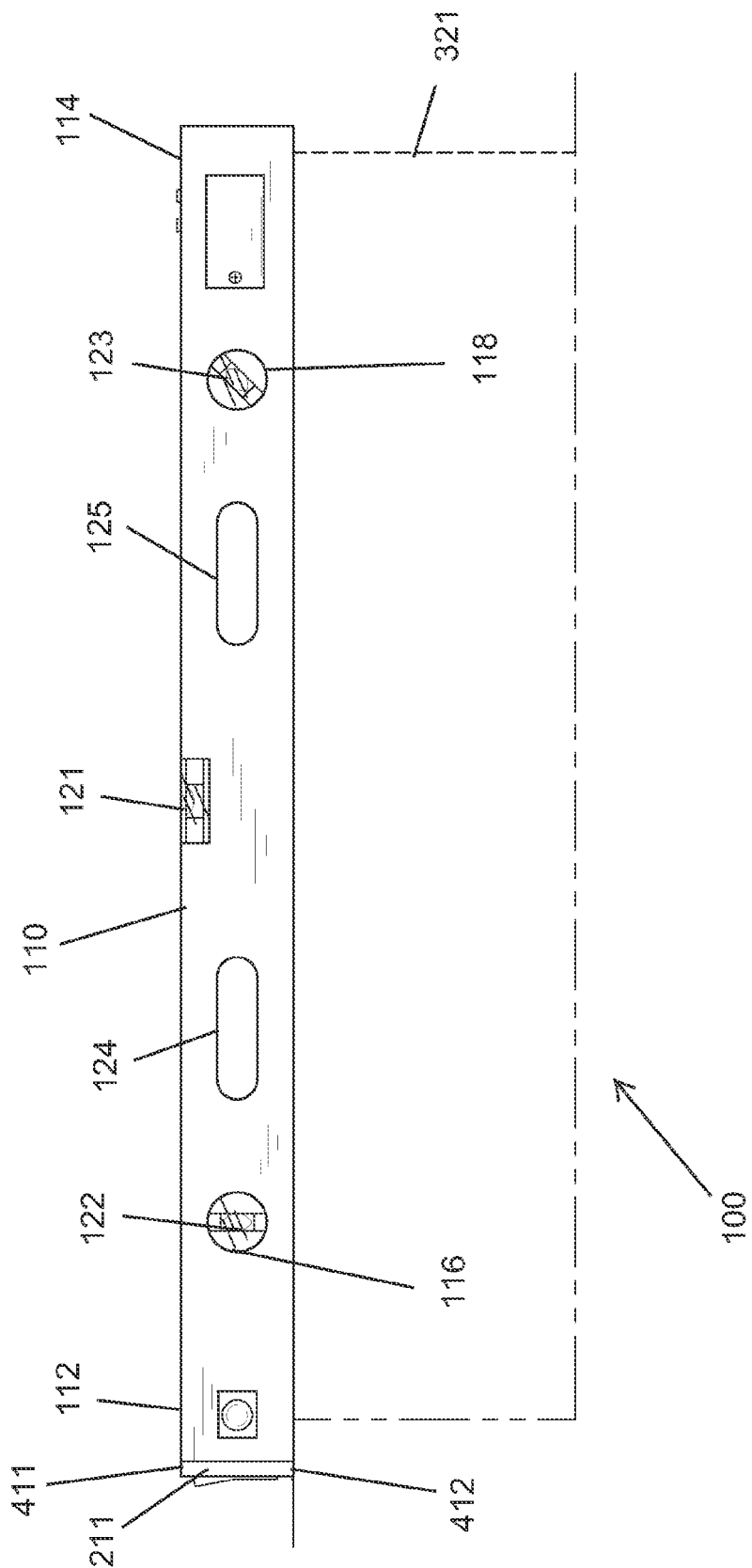
FIG. 1 shows a side view of the multifunctional bubble level.
Figure 2:
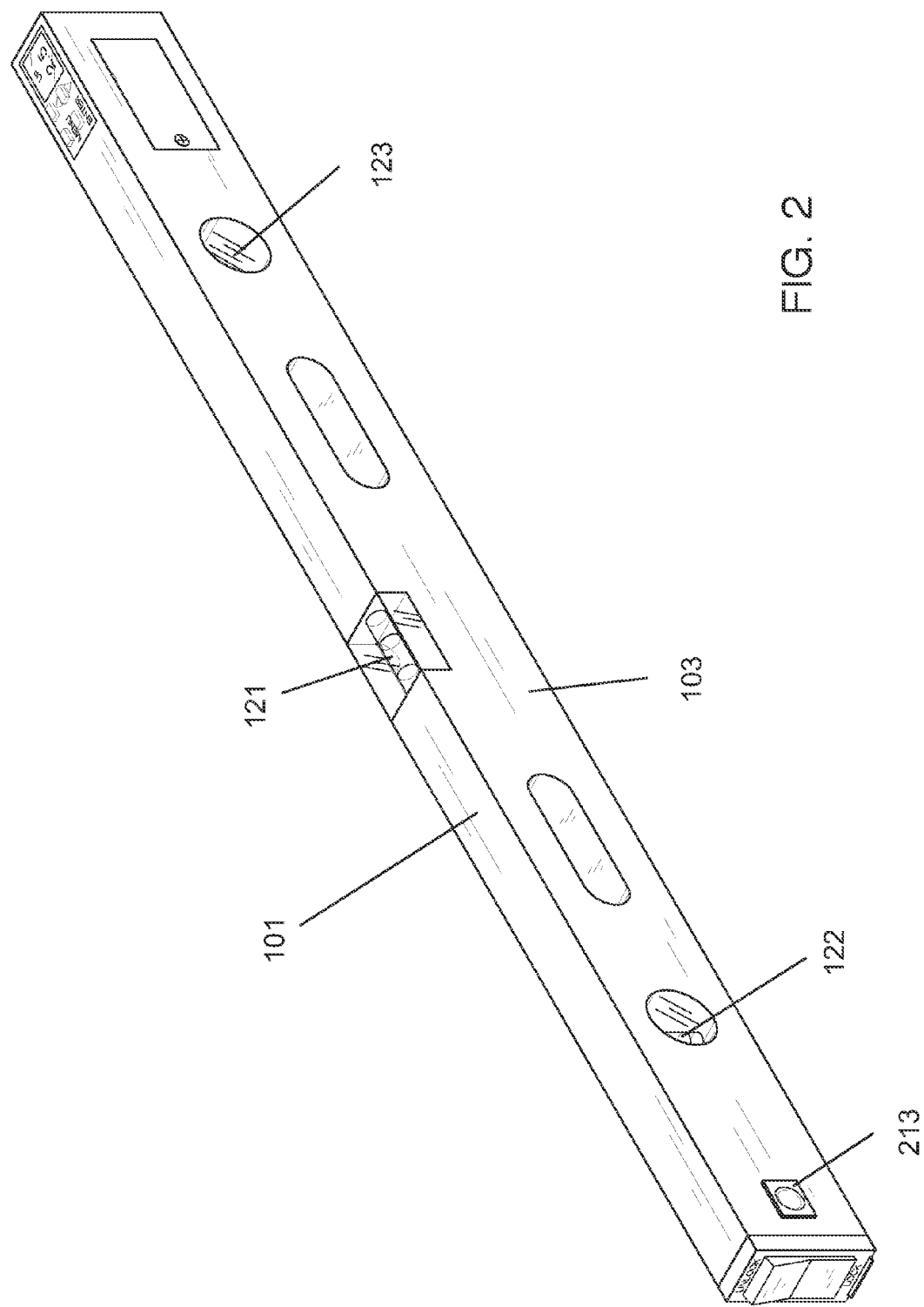
FIG. 2 shows a top/front isometric view of the multifunctional bubble level.
Figure 3:
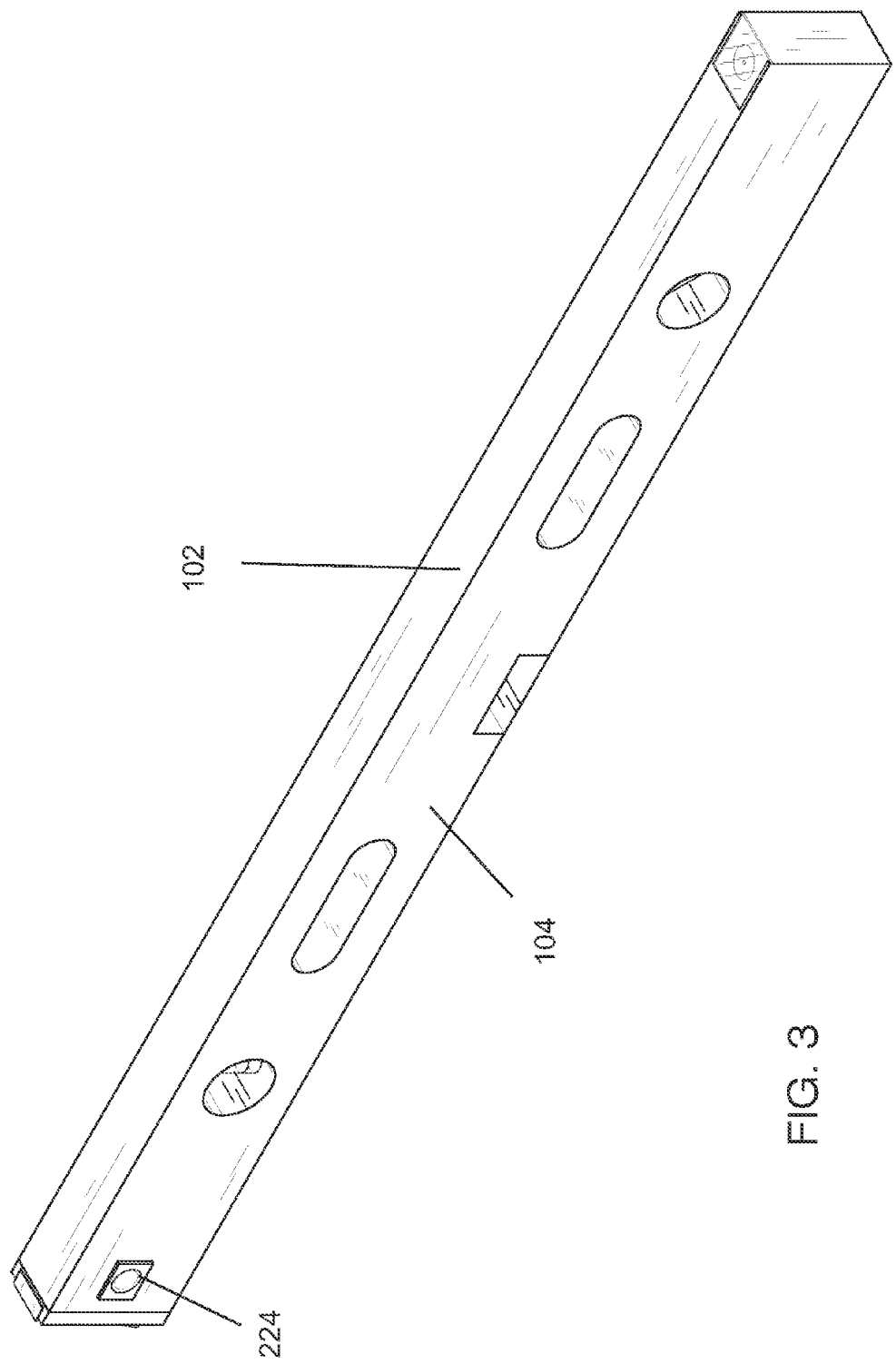
FIG. 3 shows a bottom/back isometric view of the multifunctional bubble level.
Figure 4:
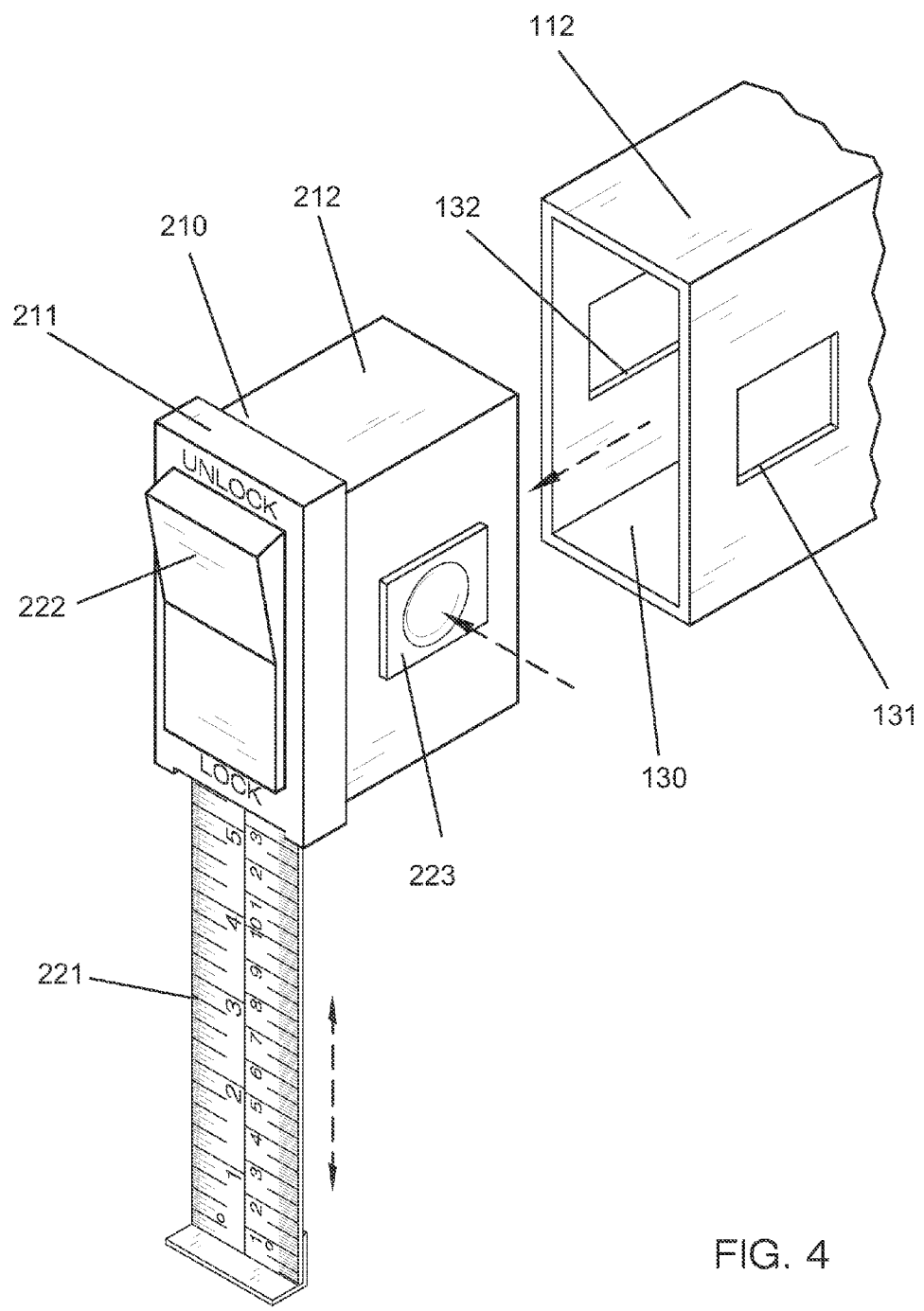
FIG. 4 shows a detailed view of the removable tap measure.
Figure 5:
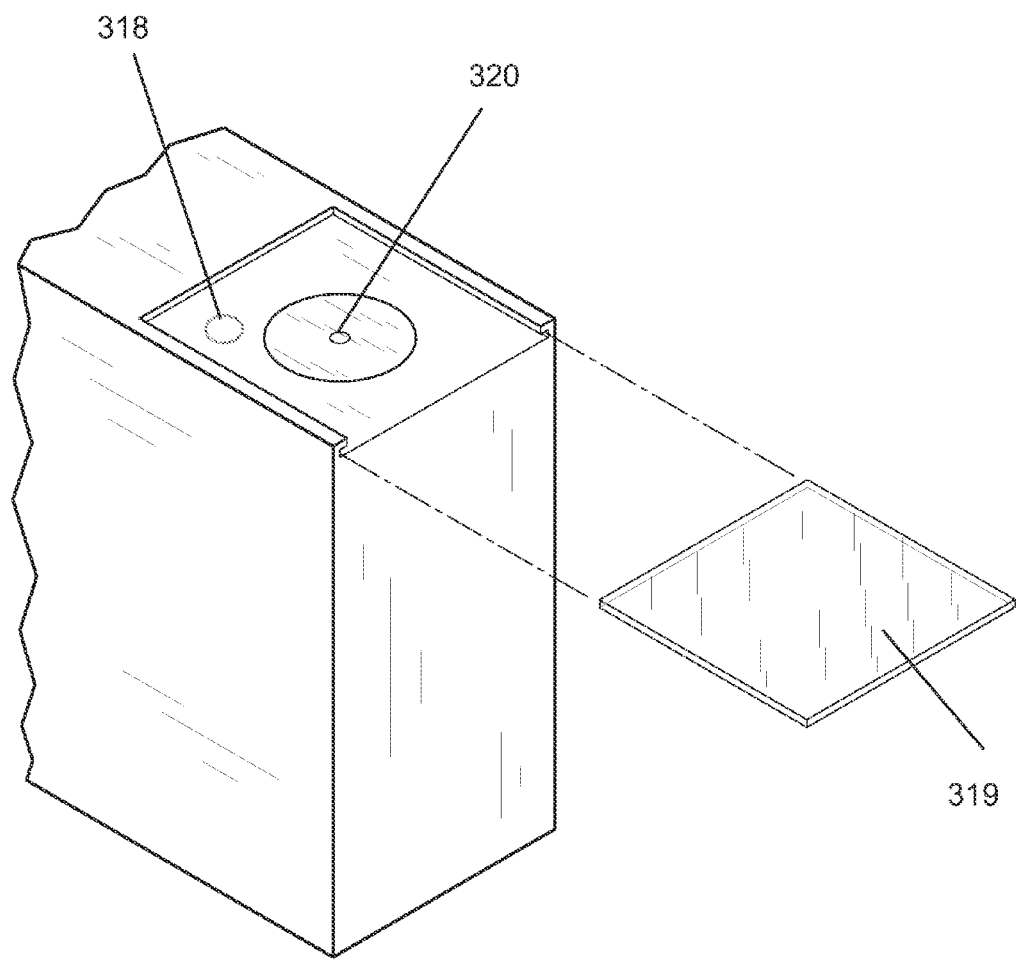
FIG. 5 shows a detailed view of the laser exit point.
Figure 6:
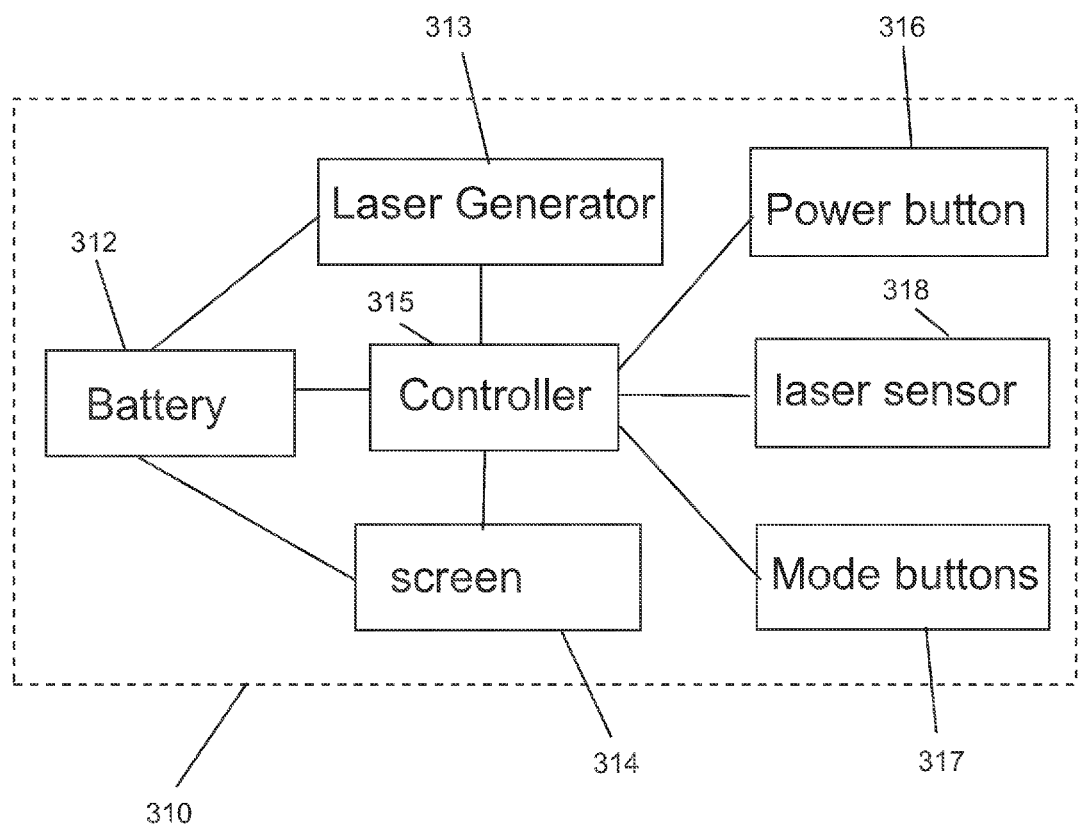
FIG. 6 shows a block diagram of the laser distance measurer.

Following is a list of elements corresponding to a particular element referred to herein:
100 bubble level
101 top side of bubble level housing
102 bottom side of bubble level housing
103 front side of bubble level housing
104 back side of bubble level housing
110 bubble level housing
112 first end of bubble level housing
114 second end of bubble level housing
116 first see-through hole
118 second see-through hole
121 horizontal bubble tube
122 vertical bubble tube
123 inclination bubble tube
124 first handle opening
125 second handle opening
130 first end opening
131 first push tab slot
132 second push tab slot
210 removable tape measure
211 tape measure head
212 tape measure body
221 ribbon
222 lock switch
223 first push tab
224 second push tab
310 laser distance measurer
311 battery compartment
312 battery
313 laser generator
314 screen
315 controller
316 power button
317 mode buttons
318 laser sensor
319 protection cover
320 laser exit point
321 laser beam Referring now to FIG. 1-6, the present invention features a multifunctional bubble level (100) with an integrated laser distance measurer (310) and a removable tape measurer (210).

The bubble level comprises a bubble level housing (110) having a first end (112) and a second end (114), wherein the housing has an top side (101), a flat bottom side (102), a front side (103) and a back side (104), wherein a first see-through hole (116) and a second see-through hole (118) are disposed within the housing between the first end (112) and the second end (124), wherein the first see-through hole (116) and the second see-through hole (118) are see-through holes passing through the front side (103) and the back side (104).

A horizontal bubble tube is disposed on the top side (101) of the housing (110) between the first end (112) and the second end (114). A vertical bubble tube (121) is disposed within the first see-through hole (116) and an inclination bubble tube (121) disposed within the second see-through hole (118). The horizontal bubble tube is parallel to the flat bottom side. The vertical bubble tube is vertical to the flat bottom side. The inclination bubble tube is at a predetermined degree related to the bottom side. In some embodiments, the predetermined degree is 45 degree, 30 degree or 60 degree. Bubble tubes are well known to one of ordinary art in the field.

A self-retracting tape measure (210) is removably attached to the first end (112) of the housing (110), wherein the tape measure (210) comprises a tape measure body (212) and a tape measure head (211) with an upper side (411) and a bottom side (412), wherein the tape measure comprises a roll of ribbon (221) with linear-measurement markings disposed within the tape measure body (212) and a lock switch (222) disposed on the head (211), wherein the lock switch (222) is switchable between a lock position to stop ribbon retraction and an unlock position to allow ribbon retraction, wherein when the lock switch (222) is at the unlock position, the ribbon (221) is extendable in a direction perpendicular to the flat bottom side (102); wherein when the self-retracting tape measure (210) attaches to the first end (112) of the housing (110), the upper side (411) of the tape measure head (211) is leveled (or flushed) with the top side (101) of the housing (110) and the bottom side (412) of the tape measure head (211) is leveled with the flat bottom side (102).

In some embodiments, the linear-measurement markings are marks with English units, such as inch and feet. In some embodiments, the linear-measurement markings are marks with metric units, such as centimeter and meter. In some embodiments, the linear-measurement markings are marks with both English units and metric units.

A laser distance measurer (310) is disposed on the second end (114) of the housing (110). The laser distance measurer (310) comprises a laser generator (313) with a laser exit point (320) disposed on the bottom side (102) of the housing (110), a laser sensor (318) disposed on the bottom side (102) of the housing (110) adjacent to the laser exit point (320), a screen (314) disposed on the top side of the housing, a battery compartment (311) disposed on the housing (110) with a battery (312) residing inside, a power button (316) disposed on the top side of the housing and a controller (315) disposed within the laser distance measurer (310). Laser distance measurers are well known to one of ordinary skill in the art.

The laser generator (313) and the screen (314) are powered by the battery (312). The controller (315) is operatively connected to the laser generator (313), the screen (314), the battery (312), the power button (316) and the laser sensor (318); wherein when the power button (316) is turned on, the controller (315) sends a first signal to the laser generator (313), wherein the laser generator (313) subsequently generates a laser beam (321) shooting out from the laser exit point (320), wherein the laser sensor (318) is configured to sense a reflective laser reflected from a target and send a reflective laser signal to the controller (315), whereupon the controller (315) compares the first signal and the reflective laser signal, generates a second signal according to the comparison results and subsequently sends the second signal to the screen, whereupon the screen displays the second signal in terms of a distance between the laser distance measurer (310) and the target. In some embodiments, the screen (314) is a liquid crystal display (LCD) screen or a segmented display.

In some embodiments, the bubble level housing (110) further comprises a first handle opening (124) and a second handle opening (125) disposed within the housing between the first end (112) and the second end (124), wherein the first handle opening (124) and the second handle opening (125) are see-through openings passing through the front side (113) and the back side (114).

In some embodiments, the laser distance measurer (310) further comprises a plurality of mode buttons (317) disposed on the top side of the housing (110), wherein the mode buttons (317) are operatively connected to the controller (315).

In some embodiments, the mode buttons (317) are configured to change a unit of the distance display on the screen (314) and thus change the value of the distance. The distance unit includes a metric unit (meter, centimeter, etc.) or a British unit (yard, feet, inch, etc.).

In some embodiments, the mode buttons (317) are configured to switch a laser distance measurer (310) operation mode between a single measurement mode and a dynamic measurement mode, wherein in the single measurement mode, the laser distance measurer (310) only performs single distance measurement, wherein in the dynamic measurement mode, the laser distance measurer (310) performs multiple distance measurements with a predetermined time interval and automatically refreshes the screen display. In some embodiments, the predetermined time interval is 5 seconds, 10 seconds, 20 seconds, 30 seconds, etc.

In some embodiments, the laser distance measurer (310) further comprises a protection cover (319) removably attached on the bottom side (102) of the housing (110), wherein the protection cover (319) is configured to cover the laser exit point (320) and the laser sensor (318) when the laser distance measurer (310) is not in operation.

In some embodiments, the first end (112) of the housing (110) has a cavity (130) configured to slidably receive the tape measure body (212). The tape measure body (212) is lockable within the cavity, wherein a first push stab (223) and a second push stab (224) are oppositely disposed on the tape measure body (212), wherein a first push tab slot (131) is disposed on the front side (103) near the first end (112) and a second push tab slot (132) is disposed on the back side (104) near the first end (112), wherein the first push tab slot (131) is configured to engage the first push stab (223) and the second push tab slot (132) is configured to engage the second push stab (224) to lock the tape measure body (212) within the cavity (130).

The disclosures of the following U.S. Patents are incorporated in their entirety by reference herein: (1) U.S. Pat. No. 4,700,489, (2) U.S. Pat. No. 6,640,056, (3) U.S. Pat. No. D488729, (4) U.S. Patent Application Publication 2004/011801, (5) U.S. Patent Application Publication 2004/0172839 and (6) U.S. Patent Application Publication 2004/0172846.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. Reference numbers recited in the claims are exemplary and for ease of review by the patent office only, and are not limiting in any way.

The reference numbers recited in the below claims are solely for ease of examination of this patent application, and are exemplary, and are not intended in any way to limit the scope of the claims to the particular features having the corresponding reference numbers in the drawings.

What is claimed is:

1. A multifunctional bubble level (100) with integrated laser distance measurer and tape measurer, wherein the bubble level comprises:
(a) a bubble level housing (110) having a first end (112) and a second end (114), wherein the housing has an top side (101), a flat bottom side (102), a front side (103) and a back side (104), wherein a first see-through hole (116) and a second see-through hole (118) are disposed within the housing between the first end (112) and the second end (124), wherein the first see-through hole (116) and the second see-through hole (118) are see-through holes passing through the front side (103) and the back side (104);
(b) a horizontal bubble tube disposed on the top side (101) of the housing (110) between the first end (112) and the second end (114); wherein the horizontal bubble tube is parallel to the flat bottom side (102);
(c) a vertical bubble tube (121) disposed within the first see-through hole (116); wherein the vertical bubble tube is vertical to the flat bottom side;
(d) an inclination bubble tube (121) disposed within the second see-through hole (118); wherein the inclination bubble tube is at a predetermined degree related to the bottom side;

(e) a self-retracting tape measure (210) removably attached to the first end (112) of the housing (110), wherein the tape measure (210) comprises a tape measure body (212) and a tape measure head (211) with an upper side (411) and a bottom side (412), wherein the tape measure comprises a roll of ribbon (221) with linear-measurement markings disposed within the tape measure body (212) and a lock switch (222) disposed on the head (211), wherein the lock switch (222) is switchable between a lock position to stop ribbon retraction and an unlock position to allow ribbon retraction; wherein when the lock switch (222) is at the unlock position, the ribbon (221) is extendable in a direction perpendicular to the flat bottom side (102); wherein when the self-retracting tape measure (210) attaches to the first end (112) of the housing (110), the upper side (411) of the tape measure head (211) is leveled with the top side (101) of the housing (110) and the bottom side (412) of the tape measure head (211) is leveled with the flat bottom side (102);

(f) a laser distance measurer (310) disposed on the second end (114) of the housing (110), wherein the laser distance measurer (310) comprises:
  (i) a laser generator (313) with a laser exit point (320) disposed on the bottom side (102) of the housing (110);
  (ii) a laser sensor (318) disposed on the bottom side (102) of the housing (110) adjacent to the laser exit point (320);
  (iii) a screen (314) disposed on the top side of the housing;
  (iv) a battery compartment (311) disposed on the housing (110) with a battery (312) residing inside; wherein the laser generator (313) and the screen (314) are powered by the battery (312);
  (v) a power button (316) disposed on the top side of the housing;
  (vi) a controller (315) disposed within the laser distance measurer (310), wherein the controller (315) is operatively connected to the laser generator (313), the screen (314), the battery (312), the power button (316) and the laser sensor (318); wherein when the power button (316) is turned on, the controller (315) sends a first signal to the laser generator (313), wherein the laser generator (313) subsequently generates a laser beam (321) shooting out from the laser exit point (320), wherein the laser sensor (318) is configured to sense a reflective laser reflected from a target and send a reflective laser signal to the controller (315), whereupon the controller (315) compares the first signal and the reflective laser signal, generates a second signal according to the comparison results and subsequently sends the second signal to the screen, whereupon the screen displays the second signal in terms of a distance between the laser distance measurer (310) and the target.

2. The multifunctional bubble level (100) of claim 1, wherein the predetermined degree is 45 degree, 30 degree or 60 degree.

3. The multifunctional bubble level (100) of claim 1, wherein the bubble level housing (110) further comprises a first handle opening (124) and a second handle opening (125) disposed within the housing between the first end (112) and the second end (124), wherein the first handle opening (124) and the second handle opening (125) are see-through openings passing through the front side (113) and the back side (114).

4. The multifunctional bubble level (100) of claim 1, wherein the laser distance measurer (310) further comprises a plurality of mode buttons (317) disposed on the top side of the housing (110), wherein the mode buttons (317) are operatively connected to the controller (315).

5. The multifunctional bubble level (100) of claim 4, wherein the mode buttons (317) are configured to change a unit of the distance display on the screen (314) and thus change the value of the distance.

6. The multifunctional bubble level (100) of claim 4, wherein the mode buttons (317) are configured to switch a laser distance measurer (310) operation mode between a single measurement mode and a dynamic measurement mode, wherein in the single measurement mode, the laser distance measurer (310) only performs single distance measurement, wherein in the dynamic measurement mode, the laser distance measurer (310) performs multiple distance measurements with a predetermined time interval and automatically refreshes the screen display.

7. The multifunctional bubble level (100) of claim 1, wherein the laser distance measurer (310) further comprises a protection cover (319) removably attached on the bottom side (102) of the housing (110), wherein the protection cover (319) is configured to cover the laser exit point (320) and the laser sensor (318) when the laser distance measurer (310) is not in operation.

8. The multifunctional bubble level (100) of claim 1, wherein the first end (112) of the housing (110) has a cavity (130) configured to slidably receive the tape measure body (212).

9. The multifunctional bubble level (100) of claim 8, wherein the tape measure body (212) is lockable within the cavity, wherein a first push stab (223) and a second push stab (224) are oppositely disposed on the tape measure body (212), wherein a first push tab slot (131) is disposed on the front side (103) near the first end (112) and a second push tab slot (132) is disposed on the back side (104) near the first end (112), wherein the first push tab slot (131) is configured to engage the first push stab (223) and the second push tab slot (132) is configured to engage the second push stab (224) to lock the tape measure body (212) within the cavity (130).

10. The multifunctional bubble level (100) of claim 1, wherein the screen (314) is a liquid crystal display (LCD) screen or a segmented display.

\* \* \* \* \*